Jan. 18, 1966    C. O. SCHMIDT, JR    3,229,328
HIDE REMOVING DEVICE
Filed March 30, 1964    2 Sheets-Sheet 1

INVENTOR.
CARL OSCAR SCHMIDT, JR.
BY
J. Warren Kinney, Jr.
ATTORNEY

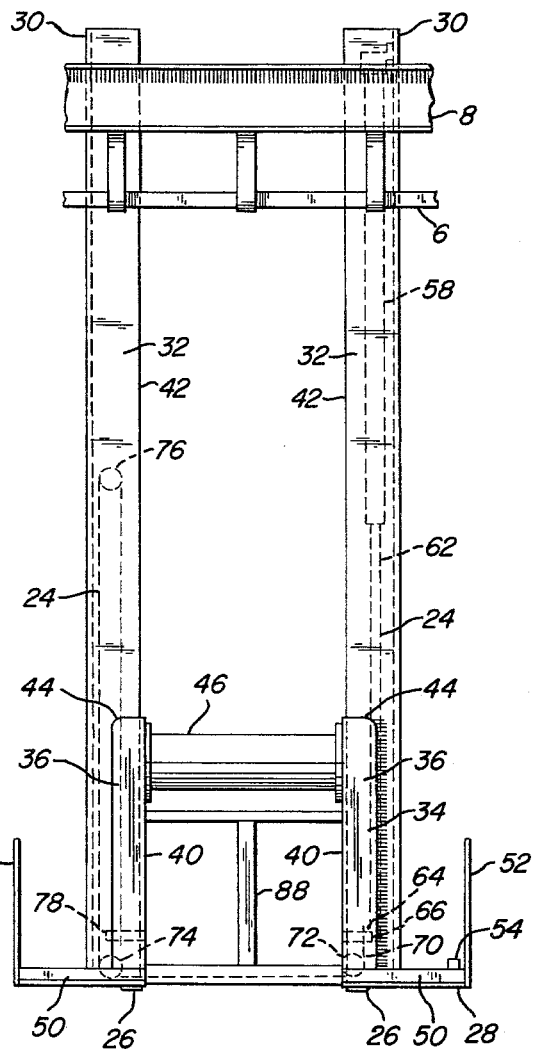
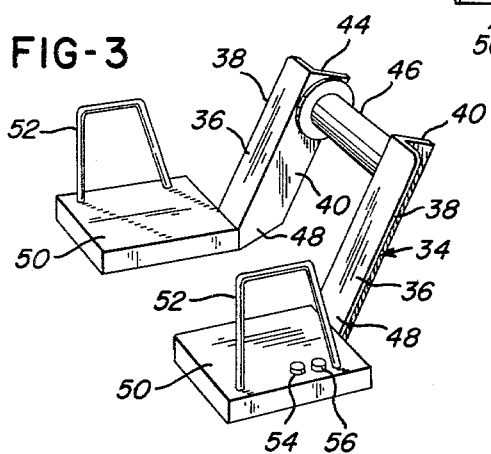

United States Patent Office 3,229,328
Patented Jan. 18, 1966

3,229,328
HIDE REMOVING DEVICE
Carl Oscar Schmidt, Jr., Cincinnati, Ohio, assignor to The Cincinnati Butchers' Supply Company, Cincinnati, Ohio, a corporation of Ohio
Filed Mar. 30, 1964, Ser. No. 355,864
13 Claims. (Cl. 17—21)

This invention relates to apparatus for removing hides from carcasses, as part of the procedure in the commercial processing of meat.

An object of the invention is to provide an improved apparatus for facilitating and expediting hide removal.

Another object is to provide apparatus for the purpose stated, which is highly compatible with production-line processing of meat in a packing plant.

A further object of the invention is to provide simple yet effective means for removing hides from carcasses, in a manner such as to save time and labor, and to conserve the energy of attendants involved in the procedure.

The foregoing and other objects are attained by the means described herein and illustrated upon the accompanying drawings, in which:

FIG. 2 is a front elevation of the same, omitting the carcass.

FIG. 3 is a perspective view of a carriage comprising a part of the apparatus.

Figure 1:
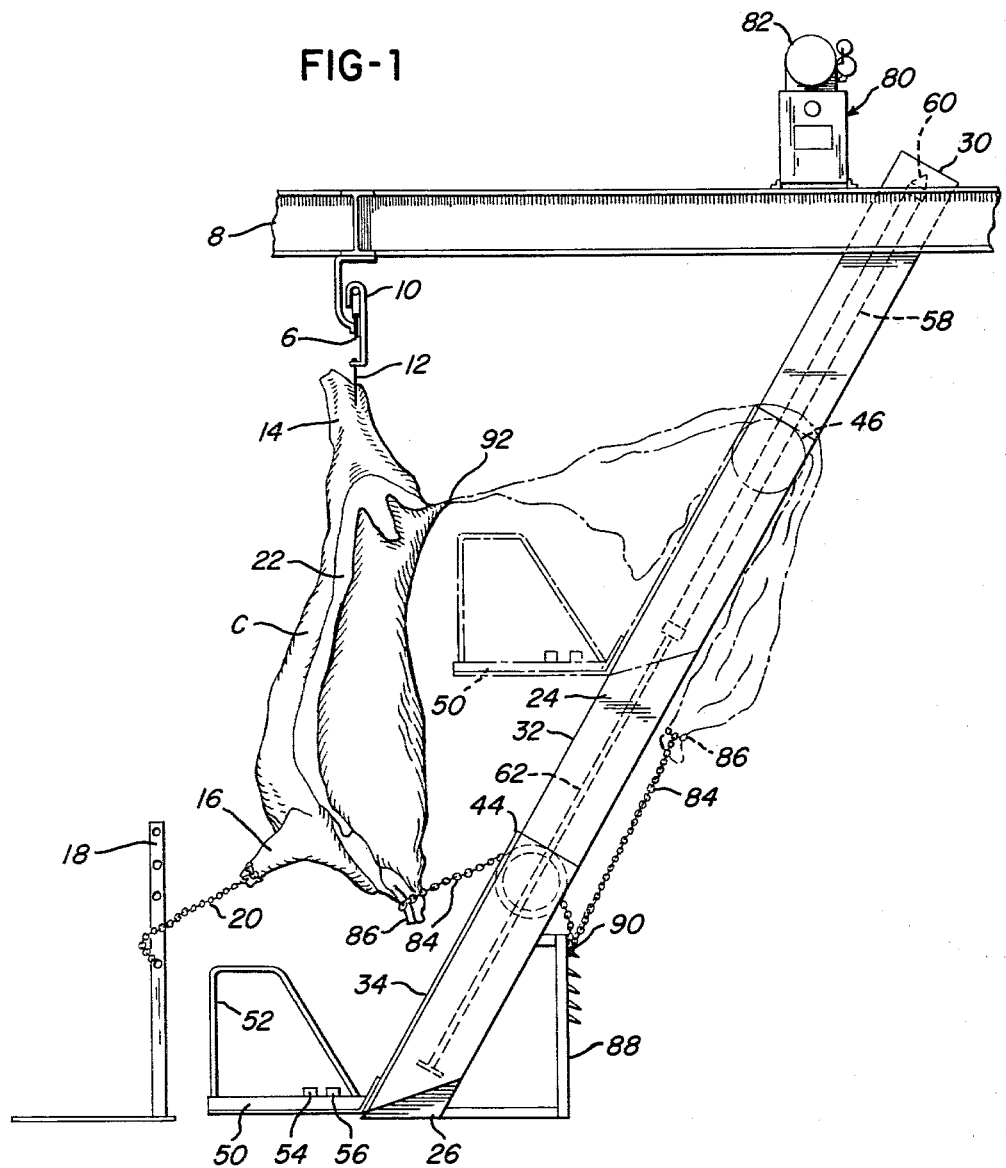
FIG. 1 is a side view of the improved hide removing apparatus, indicating the procedure of removing a hide from a suspended carcass.

With reference to the drawing, 6 indicates a conveyor rail depending from an overhead beam 8, said rail serving as a track upon which may ride a number of wheeled hangers for suspending carcasses from the hind legs thereof. One such hanger is indicated at 10, carrying a hook 12 to penetrate the leg 14. In practice, two hangers may be employed for suspending the carcass, one being applied to each hind leg thereof.

The carcass as a whole is indicated by reference character C, and the forelegs thereof are indicated at 16. Upon arrival of the carcass at the hide removal apparatus, an attendant will secure one or both forelegs to a stationary support 18, to preclude swinging of the carcass toward the hide removing apparatus, using a quick-detachable chain 20 or equivalent restraining means. The hide of the suspended carcass will have been slit lengthwise of the belly and along the legs, to provide a flap 22, at each side of the carcass, before the carcass reaches the subject hide removing apparatus. The foregoing operation will have been performed manually with ease and despatch while the carcass is suspended. There remains, however, the ordinarily laborious procedure of stripping the hide from the sides and back of the carcass, which is the primary concern of the present invention.

The hide removing apparatus may comprise a pair of inclined parallel rails 24 spaced apart, the lower ends 26 of which rest upon the floor 28, and the upper ends 30 of which reach or extend upwardly beyond beam 8. Ends 30 may or may not be secured to the beam, depending upon whether or not the hide removing apparatus is to be stationary or portable. If portability is desired, rails 24 may be suitably supported by stanchions or braces, not shown. In the example illustrated by the drawing, rails 24 may be securely anchored to floor 28 with the upper ends 30 either unsupported, or braced from beam 8 or the ceiling above. The rails extend from a location on floor 28 beneath conveyor rail 6, upwardly at an angle which disposes the upper ends 30 at a substantial distance from the conveyor rail. The angle of inclination of rails 24 may approximate sixty degrees to the floor, in a typical installation.

Rails 24 may be in the form of heavy angle irons, each presenting an upper surface 32 which may serve as a track for supporting a carriage 34 to be moved upwardly and downwardly along the rails. The carriage is shown in detail by FIG. 3, and may include a pair of spaced parallel angle members 36, 36. The outwardly directed legs 38 thereof are adapted to rest upon the surfaces 32 of rails 24, while the downwardly directed legs 40 extend between rails 24 as guides bearing lightly against the inner edges 42 of rails 24. Carriage members 36 may be joined at their upper ends 44 by a transverse spacer or strut which may be in the form of a roller 46.

At the lower ends 48 of carriage members 36 are fixed a pair of spaced platforms 50, 50, each of which is capable of supporting an attendant who will stand thereon and ride with the carriage upwardly and downwardly past the carcass, while using their skinning knives at opposite sides of the carcass. The platforms are horizontally disposed at all times, and the space between them is sufficient to flank and pass opposite sides of the suspended carcass during movement of the carriage. Each platform may be furnished with a suitable guard rail 52 to preclude an attendant from stepping off the platform while it is elevated. One platform may carry control means, such as electrical switch buttons 54 and 56, to be foot-operated for elevating and lowering the carriage along rails 24.

Suitable power means is provided for elevating and lowering the carriage 34, under the control of switch buttons 54 and 56. Such power means may comprise a long hydraulic cylinder 58 extending lengthwise of a rail 24, and anchored thereto at its upper end 60. The ram 62 of cylinder 58 may have its outer end 64 connected to a fixed stud 66 on carriage 34, whereby each retraction of the ram by hydraulic power elevates the carriage along rails 24. Lowering of the carriage may be effected by reversing the flow of hydraulic fluid within the cylinder.

To equalize the pull at opposite sides of carriage 34, a cable 70 may be attached to stud 66, and be trained about a pair of lower pulleys 72 and 74, whence the cable extends upwardly and over a third pulley 76, then downwardly to an anchor stud 78 on the carriage. The several pulleys 72, 74, 76 are rotatably mounted upon rails 24. As a substitute for the equalizing means just described, the carriage may be powered by two hydraulic cylinders, arranged to lift opposite sides of the carriage in unison, by way of the studs 66 and 78.

At the top of FIG. 1 is shown a typical hydraulic pumping unit 80, including an electric motor 82 to be controlled by the switch buttons on platform 50, for effecting elevating and lowering movements of carriage 34. An attendant riding the carriage may thereby have full control of the carriage. By preference, though not of necessity, only one of the attendants riding the carriage 34 need have control of the carriage movements by way of switch buttons 54, 56.

After the carcass has been prepared for hide removal by slitting the belly portion and exposing the flaps 22 at opposite sides thereof, an attendant will clamp a puller such as chain 84 to that portion 86 of the hide which was separated from the forelegs. The chain or puller will then be passed over roller 46, and dropped downwardly behind the roller for attachment to a stationary support 88 located beneath the roller. The attachment may be quickly effected by simply impaling a link of the chain upon one of several pins 90 carried by support 88.

With the hide held by chain 84, and the forelegs held by chain 20, the carriage 34 may be placed in motion to climb the rails 24. The carriage movement causes roller 46 to progressively tighten chain 84, with a tendency to strip the hide upwardly from the carcass. The attendants, standing upon platforms 50, 50, may assist the hide removal operation by progressively severing the hide from the carcass as chain 84 acts to keep the hide drawn taut incident to upward travel of the carriage and roller 46.

By the time platforms 50 reach the limit of elevation shown by broken lines in FIG. 1, the hide will have been completely separated from the carcass, leaving possibly a small tail connection at 92 to be easily severed by a skinning knife in the hands of an attendant. Upon severance of the tail connection, the hide aided by the weight of chain 42 will pass over roller 46 to the right in FIG. 1, and will drop to floor 28 or into a suitable container placed to receive the severed hide. An attendant may thereupon depress one of the switch buttons 54 or 56, to initiate lowering of carriage 34 to starting position. The dressed carcass may then be detached from chain 20 and moved along rail 6 for further processing, making the hide removal apparatus available for a subsequent dehiding operation.

Pins 90 carried by stationary support 88, may advantageously be inclined downwardly as shown, so as to automatically release chain 84 as the severed hide drops bodily from roller 46. In practice, it is found convenient to have on hand a supply of chains 20 and 84, in the interest of continuity of operation.

What is claimed is:

1. Apparatus for removing the hide from a carcass suspended by its hind legs, comprising in combination: an inclined frame, a carriage thereon movable upwardly and downwardly along the frame, an elongate flexible puller having opposite ends, one of which ends may be secured to the hide near the forelegs of the carcass, for pulling the hide off the suspended carcass incident to movement of the carriage along the frame in one direction, a transverse strut mounted upon and movable with the carriage, and about which strut the flexible puller may be draped, and means for stationarily anchoring the remaining end of the puller while the carriage advances in said one direction to draw the puller taut about the strut between said anchoring means and the aforesaid point of securement of the puller to the hide.

2. Apparatus as set forth in claim 1, wherein the puller is a flexible chain having one end readily detachable from the foreleg portion of the hide, a second end readily detachable from the fixed anchorage, and an intermediate portion drawn taut over the strut as the carriage moves upwardly along the frame.

3. Apparatus for removing the hide from a carcass suspended by its hind legs, comprising in combination: an inclined frame, a carriage thereon movable upwardly and downwardly along the frame, means including a puller having an end secured to the hide near the forelegs of the carcass, for pulling the hide upwardly off the suspended carcass incident to upward movement of the carriage, and platform means movable with the carriage at a rate of speed corresponding to the rate of removal of the hide from the carcass, for transporting an attendant aiding removal of the hide by said puller means.

4. Apparatus as set forth in claim 3, wherein the combination includes power means for moving the carriage, and control means for said power means accessible to an attendant while the carriage is in motion.

5. Apparatus for removing the hide from a carcass suspended by its hind legs, comprising in combination: an inclined frame, a carriage thereon movable upwardly and downwardly along the frame, a transverse member on the carriage movable therewith, a flexible elongate puller having opposite ends and an intermediate portion, means on one end of the puller for detachable connection with the foreleg portion of the hide of the suspended carcass, anchorage means in fixed relationship to the frame, including means for detachable connection with the remaining end of the flexible puller, for support of said remaining end while the intermediate portion of the puller is trained loosely over the transverse member of the carriage when lowered, power means for upwardly moving the carriage and its associated transverse member, to draw taut the flexible puller and progressively strip the hide upwardly off the carcass toward the hind legs as the carriage moves upwardly along the frame, the upward travel of the carriage being of an extent such as to enforce draping of the stripped hide over the transverse member of the carriage as the carriage approaches the upper limit of its travel.

6. Apparatus as set forth in claim 5, wherein is included means to substantially immobilize the carcass in the direction of the inclined frame, during the hide stripping operation.

7. Apparatus for removing the hide from a carcass suspended by its hind legs, comprising in combination: an inclined frame, a carriage thereon movable upwardly and downwardly along the frame, a transverse member on the carriage movable therewith, a flexible elongate puller having opposite ends and an intermediate portion, means on one end of the puller for detachable connection with the foreleg portion of the hide of the suspended carcass, anchorage means fixed relative to the frame, including means for detachable connection with the remaining end of the flexible puller, for support of said remaining end while the intermediate portion of the puller is draped over the transverse member of the carriage when lowered, power means for moving the carriage, operative upon upward movement of the carriage to draw the puller taut over the transverse member and progressively strip the hide upwardly off the carcass toward the hind legs thereof, the upward travel of the carriage being of an extent such as to enforce draping of the stripped hide over the transverse member as the carriage approaches the upper limit of its travel, and platform means movable with the carriage for transporting at least one attendant aiding removal of the hide.

8. Apparatus as set forth in claim 7, wherein the combination includes, control means for the power means of the carriage, said control means being accessible to an attendant in all positions of the carriage upon the frame.

9. Apparatus for removing the hide from a carcass suspended by its hind legs, comprising in combination: an inclined frame, a carriage thereon movable upwardly and downwardly along the frame, a transverse member on the carriage movable therewith, a flexible elongate puller having opposite ends and an intermediate portion, means on one end of the puller for detachable connection with the foreleg portion of the hide of the suspended carcass, anchorage means fixed relative to the frame, including means for detachable connection with the remaining end of the flexible puller, for support of said remaining end while the intermediate portion of the puller is draped over the transverse member of the carriage when lowered, power means for moving the carriage, operative upon upward movement of the carriage to draw the puller taut over the transverse member and progressively strip the hide upwardly off the carcass in the direction of the hind legs, a pair of platforms on the carriage for movement therewith and adapted to transport two attendants assisting the hide removal operation, said platforms being horizontally disposed, and spaced apart to flank and pass the suspended carcass during movement of the carriage.

10. Apparatus as set forth in claim 9, wherein the combination includes control means for the power means of the carriage, said control means being in all positions of the carriage accessible to at least one of the attendants riding upon the platforms.

11. Apparatus for removing the hide from a carcass suspended from its hind legs, comprising in combination: an elongate frame having a lower end disposed approximately beneath the suspended carcass, said frame being inclined upwardly and away from the backbone of the carcass, a carriage on the frame movable upwardly and downwardly lengthwise thereof, a horizontal elongate roller journaled upon the carriage for rotation, and being bodily movable with the carriage, a flexible elongate puller having opposite ends and an intermediate portion, means on one end of the puller for detachable connection with the foreleg portion of the hide of the suspended carcass, anchorage means fixed relative to the frame, including means for detachable connection with the remaining end of the flexible puller, for support of said remaining end while the intermediate portion of the puller is draped over the roller, and power means for moving the carriage, operative upon upward movement of the carriage to draw the puller taut over the roller for progressively stripping the hide upwardly off the carcass and across the roller, to the extent that the hide upon complete detachment from the carcass, gravitates to continue the roller rotation until the hide leaves the roller.

12. Apparatus as set forth in claim 11, wherein the combination includes a pair of platforms on the carriage for movement therewith and adapted to transport two attendants assisting the hide removal operation, said platforms being spaced apart to flank and pass the suspended carcass during movement of the carriage.

13. Apparatus as set forth in claim 12, wherein the combination includes control means for the power means of the carriage, said control means being in all positions of the carriage accessible to at least one of the attendants riding upon the platforms.

References Cited by the Examiner

UNITED STATES PATENTS

| 2,789,310 | 4/1957 | Soss | 17—23 |
| 3,129,454 | 4/1964 | Johnson | 17—21 |

SAMUEL KOREN, *Primary Examiner.*

LUCIE H. LAUDENSLAGER, *Examiner.*